United States Patent [19]
Shrader

[11] Patent Number: 5,134,410
[45] Date of Patent: Jul. 28, 1992

[54] SENSITIVITY VELOCITY CONTROL

[75] Inventor: William W. Shrader, Stow, Mass.

[73] Assignee: Raytheon Company, Lexington, Mass.

[21] Appl. No.: 742,124

[22] Filed: Aug. 8, 1991

[51] Int. Cl.$^5$ .............................................. G01S 13/52
[52] U.S. Cl. ....................................... 342/90; 342/159
[58] Field of Search .................................. 349/90, 159

[56] References Cited

U.S. PATENT DOCUMENTS 4,907,001 3/1990 Harmuth ............................. 342/159

OTHER PUBLICATIONS

"Radar Technology Applied to Air Traffic Control," William W. Shrader, IEE Transactions on Communications, vol. COM-21, No. 5, May 1973, pp. 591–605.

"Radar System Engineering," Louis N. Ridenour, Boston Technical Publishers, Inc., Lexington, Mass. 02173, 1964, p. 460, SEC. 12:8.

"Radar Handbook," Merrill I. Skolnik, Second Edition, McGraw-Hill Publishing Company, New York, N.Y., pp. 15.69–15.70.

Primary Examiner—T. H. Tubbesing
Attorney, Agent, or Firm—Walter F. Dawson; Richard M. Sharkansky

[57] ABSTRACT

A sensitivity velocity control program in a surveillance radar for distinguishing wanted moving targets from unwanted moving targets by processing radar target return data and having prestored evaluation criteria for accepting/rejecting the moving targets. The radar target return signals are processed to determine their true radial velocity and apparent radar cross section. The program evaluates these measurements based on a look-up table of preselected acceptable levels of minimum true radial velocity for each apparent radar cross section. The program declares a target acceptable when its radial velocity matches or exceeds the preselected minimum radial velocity for that radar cross section stored in a computer memory. The acceptance criteria relates to the type of target (aircraft, missile, bird, etc.) being accepted or rejected. In general, the criteria accepts large targets having low to high radial velocities. The smaller the apparent radar cross section of the target, the higher the true radial velocity must be for acceptance. The true radial velocity versus apparent radar cross section profile is intended to accept aircraft and missiles but reject birds.

12 Claims, 4 Drawing Sheets

SENSITIVITY VELOCITY CONTROL

The Government has rights in this invention pursuant to Contract No. N00014-86-C-2229, awarded by the Department of the Navy.

BACKGROUND OF THE INVENTION

This invention relates to surveillance radar and more particularly to a method and apparatus for distinguishing between wanted and unwanted moving targets.

Surveillance radars have historically had difficulty distinguishing desired moving targets such as aircraft from undesired moving targets such as birds. The apparent radar cross section (RCS) of wanted targets is often less than the RCS of unwanted targets due to target fluctuations, multipath, radar antenna patterns and the size of aircraft and missiles. Techniques such as moving target indication (MTI) are insufficient to distinguish unwanted targets from wanted targets because the radial velocities (i.e., the component of velocity in the direction of the radar) of the unwanted targets often equal or exceed the ambiguous radial velocity of the desired targets.

The primary means of rejecting unwanted targets in surveillance radars have been the use of sensitivity time control (STC), two-beam antenna techniques (which assume that unwanted targets are near the earth's surface) and clutter maps. These techniques are described in "Radar Handbook" by Merrill Skolnik, Editor in Chief, second edition, McGraw-Hill Publishing Company, 1990, pp. 15.6514 15.70. Although each of these techniques provides some mitigation of the unwanted target problem, each has sufficient shortcomings to prevent achieving a desired performance level. An alternative method of eliminating unwanted targets in fire control radars is to eliminate all targets with absolute radial velocities below some value such as 120 knots. However, this solution is not available to surveillance radars with relatively low ambiguous velocities which are typically around 80 knots.

SUMMARY OF THE INVENTION

Accordingly, it is therefore an object of this invention to provide a method and apparatus for distinguishing wanted targets from unwanted targets in a surveillance radar.

It is a further object of this invention to distinguish between wanted and unwanted targets based on a combination of true radial velocity and apparent target radar cross section.

The objects are further accomplished by providing a method of sensitivity velocity control in a radar system comprising the steps of generating a radial velocity from a radar target return signal, generating an apparent radar cross section from the radar target return signal, and testing the radial velocity and the radar cross section to determine if the radar target return signal is acceptable by being outside of a reject boundary.

The objects are further accomplished by providing a method of sensitivity velocity control in a radar system comprising the steps of estimating a radial velocity from a radar target return signal, determining if a no valid velocity estimate signal is generated by a radial velocity generator means which indicates a reject target, estimating an apparent radar cross section of the radar target return signal, determining if the apparent radar cross section is below a minimum value resulting in a reject target, testing the radar target return signal in accordance with a velocity estimate quality signal to determine if the target return signal is below a predetermined level of the velocity estimate quality signal resulting in a reject target, and testing the radial velocity estimate and the radar cross section estimate to determine if the radar target return signal is acceptable by being outside of a reject boundary.

The objects are further accomplished by providing a sensitivity velocity control apparatus in a radar system comprising means for generating a radial velocity from a radar target return signal, means for generating an apparent radar cross section of the radar target return signal, and means for testing the radial velocity and the apparent radar cross section to determine if the radar target signal is acceptable by being outside of a reject boundary. The testing means comprises memory means for storing the reject boundary.

The objects are further accomplished by providing a sensitivity velocity control apparatus in a radar system comprising means for estimating a radial velocity from a radar target return signal, means for determining if a no valid velocity estimate signal is generated by the radial velocity estimating means indicating a reject target, means for estimating an apparent radar cross section of the radar target return signal, means for determining if the apparent radar cross section is below a minimum value resulting in a reject target, means for testing the radar target return signal in accordance with a velocity estimate quality signal to determine if the radar target return signal is below a predetermined level of the velocity estimate quality signal, and means for testing the radial velocity and the apparent radar cross section to determine if the radar target signal is acceptable by being outside of a reject boundary. The reject boundary testing means comprises memory means for storing the reject boundary.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
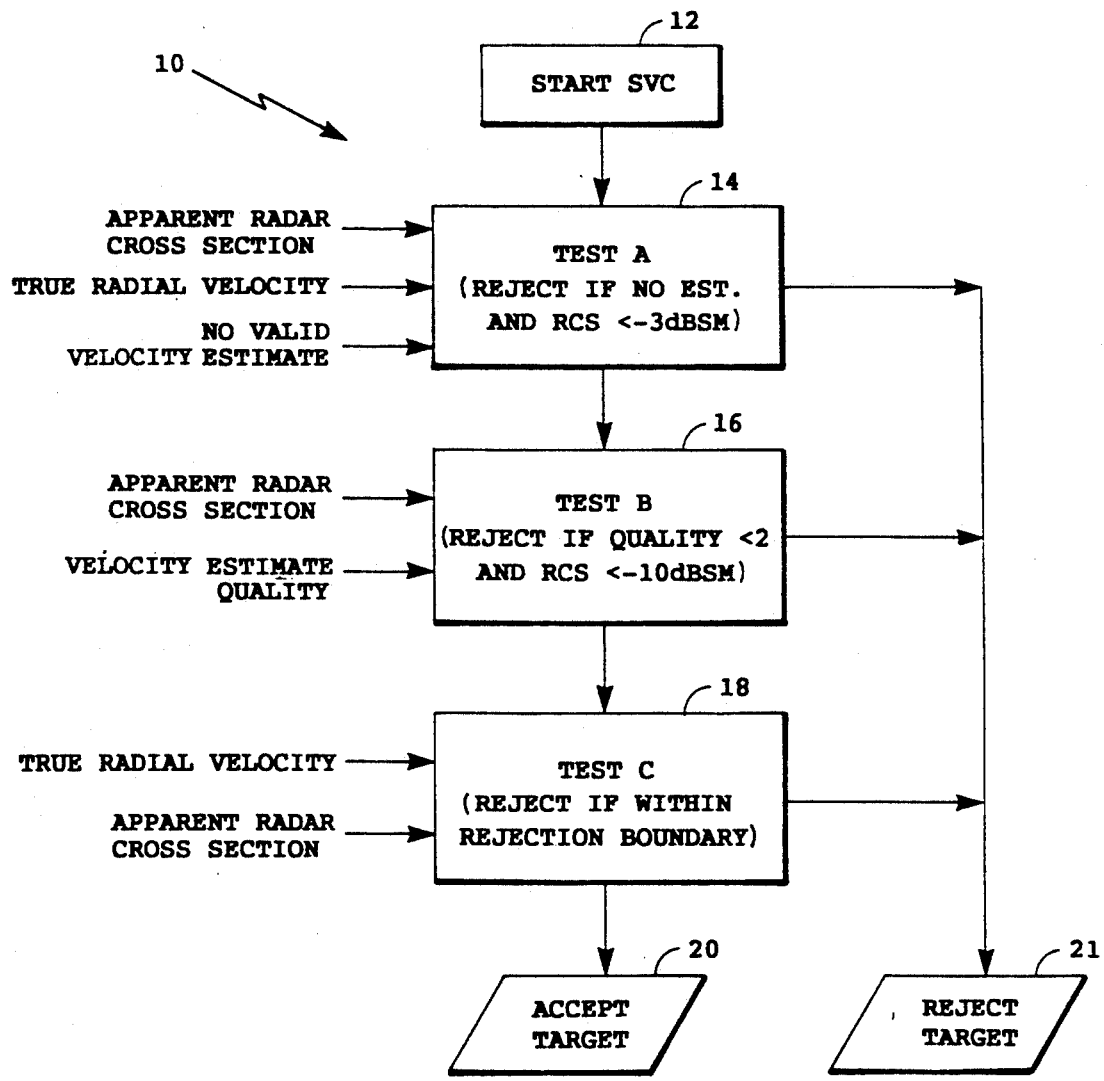
FIG. 1 is a flow chart of the present invention of a sensitivity velocity control in a surveillance radar.

Referring to FIG. 1, a flow chart of the present invention of a method of Sensitivity Velocity Control (SVC) in a surveillance radar is shown for distinguishing wanted targets from unwanted targets based on processing a combination of a true radial velocity and an apparent target radar cross section (RCS). In general, the SVC program 10 of FIG. 1 evaluates these processed measurements against preselected accept/reject boundary data (FIG. 2) stored in a computer memory comprising acceptable levels of minimum true radial velocity for each apparent radar cross section. The invention is based on the following criteria: if a radar target is small and slow, it probably is an unwanted target; if the radar target is fast (no matter how small) or if the radar target is large (even if the radial velocity is low) it probably is a wanted target.

Figure 3:
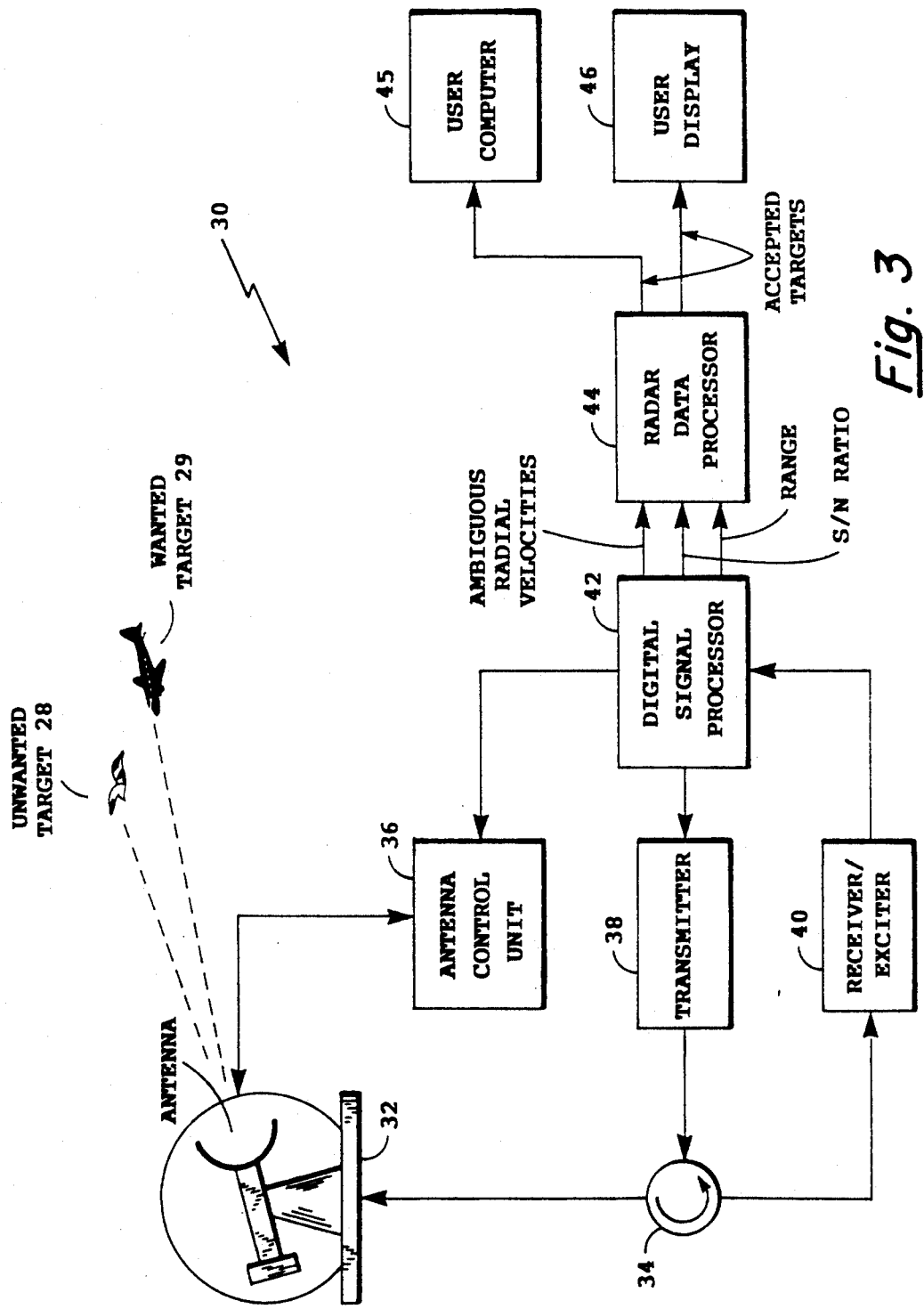
FIG. 3 is a block diagram of a surveillance radar embodying the invention.

Referring to FIG. 3, a functional block diagram of a Radar System 30 is shown which employs the Sensitivity Velocity Control Program 10 in a Radar Data Processor 44. The Radar System 30 comprises a Transmitter 38 and a Receiver/Exciter 40 which are coupled via a Duplexer 34 to an Antenna 32 for transmitting signals to targets and for receiving returned signals. The Antenna Control Unit 36 is coupled between the Antenna 32 and a Digital Signal Processor (DSP) 42. The Antenna Control Unit 36 is used to control and report the positioning of the Antenna 32; the DSP 42 forms the base data from analog signals received from the Receiver/Exciter 40 such as the Ambiguous Radar Velocities, Signal To Noise (S/N) Ratio and Range. The Radar Data processor 44 coupled to such base data from the DSP 42 processes such base data to determine wanted targets from unwanted targets. The base data received from the DSP 42 is processed by the Sensitivity Velocity Control Program 10 in the RDP 44. The wanted targets are coupled to a User Computer 45 for utilization such as target tracking and to a User Display 46 which displays the wanted or accepted targets.

Figure 4:
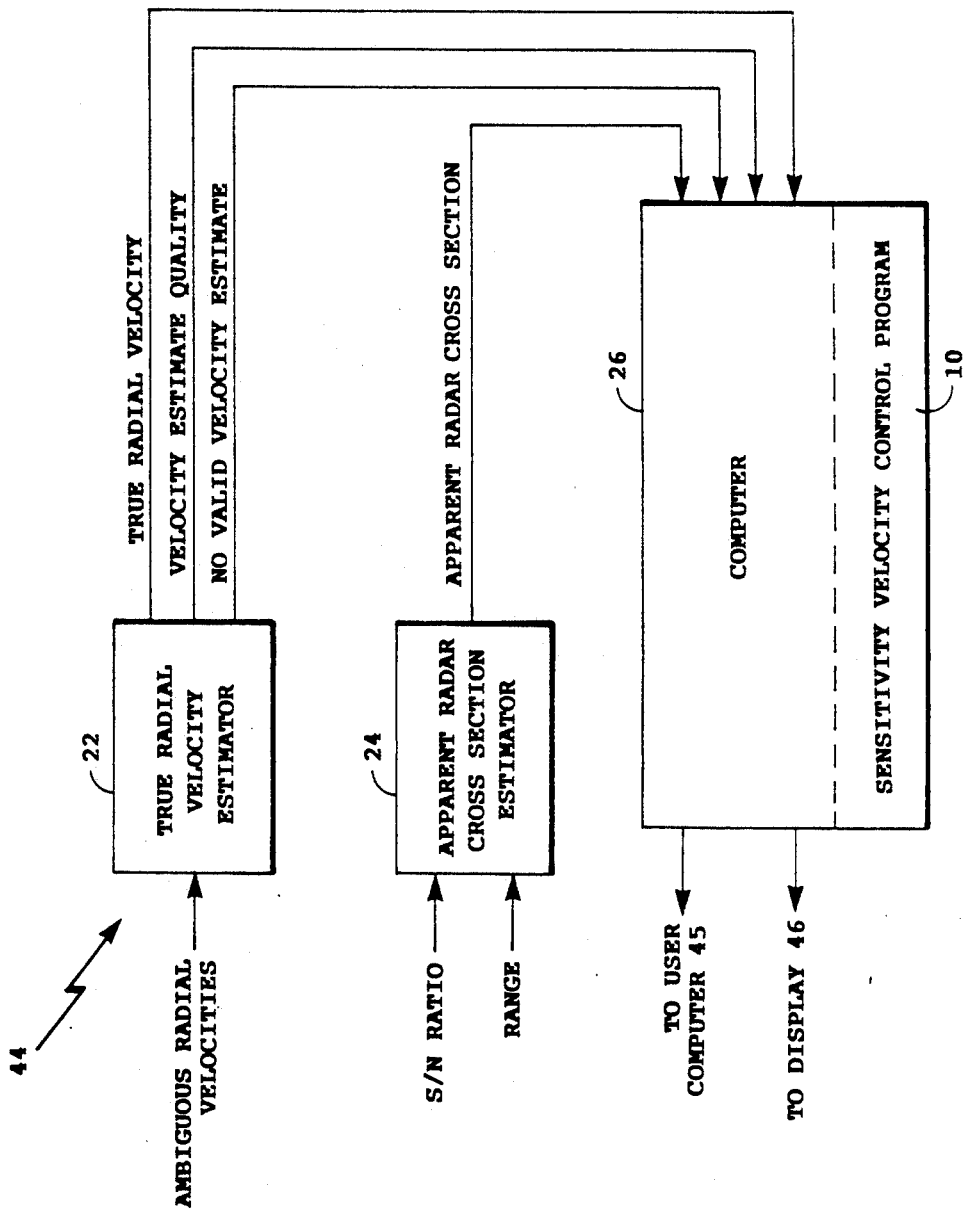
FIG. 4 is a block diagram of the radar data processor shown in FIG. 3 embodying the invention.

Referring now to FIG. 4, a block diagram of the Radar Data Processor 44 is shown comprising a True Radial Velocity Estimator 22 and an Apparent Radar Cross-section Estimator 24, both of which have outputs coupled to a Computer 26 comprising the Sensitivity Velocity Control Program 10. The True Radial Velocity Estimator 22 receives up to five Ambiguous Radial Velocities, each measured with a different pulse repetition frequency, from the DSP 42, and it determines the True Radial Velocity. It also generates a Velocity Estimate Quality signal or a No Valid Velocity Estimate signal which is used by the SVC program 10 along with the True Radial Velocity to perform a first test (Test A 14) on the radar target return data. The True Radial Velocity Estimator 22 examines how closely the ambiguous radial velocity estimates cluster at each possible true radial velocity. The true radial velocity is determined where a cluster is found. The Velocity Estimate Quality signal is based on how well the ambiguous radial velocity estimates cluster at the estimated true radial velocity. The Velocity Estimate Quality signals range from 1 to 4 with 4 being the best quality. If the ambiguous radial velocity estimates do not cluster at any true radial velocity, then a No Valid Velocity Estimate signal is generated. The Apparent Radar Cross Section Estimator 24 receives the S/N Ratio (SNR) signal and the Range signal from the DSP 42 and generates the Apparent Radar Cross Section signal which is connected to Computer 26 and used by the SVC program 10 to perform a second test (Test B 16) on the radar target return data. To determine the apparent radar cross section (RCS), the Radar System 30 is characterized by a Reference SNR for a Reference RCS at a Reference Range. Then the measured Range and SNR are used to calculate the apparent RCS in accordance with the following formula:

$$\text{Apparent } RCS = \frac{(\text{Range}/\text{Reference Range})^4}{(SNR/\text{Reference } SNR)} (\text{Reference } RCS)$$

Figure 2:
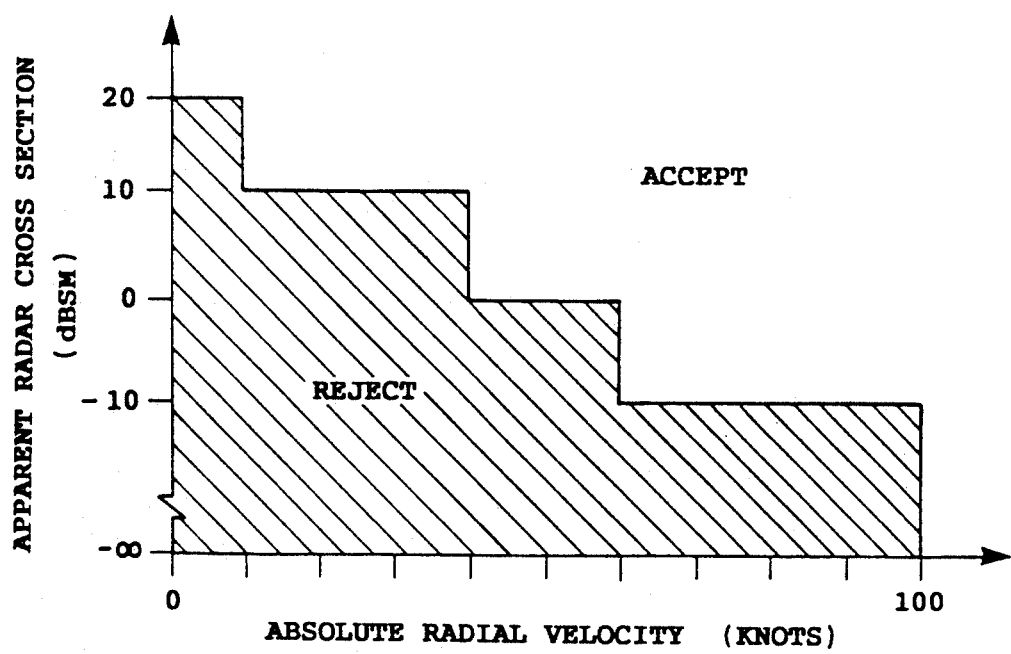
FIG. 2 is a graph of an apparent radar cross section versus an absolute radial velocity showing target accept and reject boundaries.

Referring again to FIG. 1 and also FIG. 2, the Sensitivity Velocity Control Program 10, which is located in a memory of the Computer 26 (FIG. 4), tests the radar target return data to distinguish between wanted targets such as aircraft and unwanted targets such as birds. When START SVC 12 occurs the first step performs a Test A 14 on the Apparent Radar Cross Section, True Radial Velocity and the No Valid Velocity Estimate signals. The radar target return data is determined to be a Reject Target 21 if Test A 14 determines that the No Valid Velocity Estimate signal is "active" and if the Apparent Radar Cross Section is less than −3 dBSM. If the radar target data passes Test A 14, the second step performs the Test B 16 on the Apparent Radar Cross Section and Velocity Estimate Quality signals. Test B 16 determines that if the Velocity Estimate Quality signal is less than 2 and the Apparent Radar Cross Section is less then −10 dBSM, then the radar return target data is a Reject Target 21. If the radar target data passes Test B 16, then the third step performs Test C 18 on the True Radial Velocity and Apparent Radar Cross Section signals. Test C 18 determines if the radar target return data is within a predetermined boundary, and if it is, then the target data is a Reject Target 21; otherwise an Accept Target 20 has been determined. FIG. 2 is a graph of the Apparent Radar Cross Section versus the Absolute Radial Velocity showing a typical predetermined boundary between an Accept Target 20 and a Reject Target 21. As pointed out hereinbefore, the Sensitivity Velocity Control Program 10 is based on the criteria that if the radar target is small and slow, it probably is an unwanted target, and if the radar target is fast (no matter how small) or if the radar target is large (even if the radial velocity is low), it probably is a wanted target.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A method of sensitivity velocity control in a radar system comprising the steps of:
    generating a radial velocity from a radar target return signal;
    generating an apparent radar cross section from said radar target return signal; and
    testing said radial velocity and said apparent radar cross section to determine if said radar target return signal is acceptable by being outside of a reject boundary.

2. A method of sensitivity velocity control in a radar system comprising the steps of:
    generating a radial velocity from a radar target return signal;
    testing said radar target return signal in accordance with a quality of velocity signal generated by a radial velocity generator means;
    generating an apparent radar cross section from said radar target return signal; and
    testing said radial velocity and said apparent radar cross section to determine if said radar target return signal is acceptable by being outside of a reject boundary.

3. A method of sensitivity velocity control in a radar system comprising the steps of:
    generating a radial velocity from a radar target return signal;

determining if a no valid velocity signal is generated by a radial velocity generator means which indicates a reject target;

testing said radar target return signal in accordance with a velocity estimate quality signal generated by said radial velocity generator means;

generating an apparent radar cross section from said radar target return signal; and testing said radial velocity and said apparent radar cross section to determine if said radar target return signal is acceptable by being outside of a reject boundary.

4. A method of sensitivity velocity control in a radar system comprising the steps of:

estimating a radial velocity from a radar target return signal;

determining if a no valid velocity estimate signal is generated by a radial velocity generator means;

estimating an apparent radar cross section of said radar target return signal;

determining if said apparent radar cross section is below a minimum value resulting in a reject target;

testing said radar target return signal in accordance with a velocity estimate quality signal to determine if said target return signal is below a predetermined level of said velocity estimate quality signal resulting in a reject target; and testing said radial velocity estimate and said apparent radar cross section estimate to determine if said radar target return signal is acceptable by being outside of a reject boundary.

5. A sensitivity velocity control apparatus in a radar data processor comprising:

means for generating a radial velocity from a radar target return signal;

means for generating an apparent radar cross section of said radar target return signal; and computing means coupled to said radial velocity generating means and said apparent radar cross section generating means for testing said radial velocity and said apparent radar cross section to determine if said radar target signal is acceptable by being outside of a reject boundary.

6. The sensitivity velocity control apparatus as recited in claim 5 wherein:

said testing means comprises memory means for storing said reject boundary.

7. A sensitivity velocity control apparatus in a radar data processor comprising:

means for generating a radial velocity from a radar target return signal;

means coupled to said radial velocity generating means for testing said radar target return signal in accordance with a velocity estimate quality signal generated by said radial velocity generating means;

means for generating an apparent radar cross section of said radar target return signal; and said testing means further comprises means for testing said radial velocity and said apparent radar cross section to determine if said radar target signal is acceptable by being outside of a reject boundary.

8. The sensitivity velocity control apparatus as recited in claim 7 wherein:

said reject boundary testing means comprises memory means for storing said reject boundary.

9. A sensitivity velocity control apparatus in a radar data processor comprising:

means for generating a radial velocity from a radar target return signal;

computing means coupled to said radial velocity generating means for determining if a no valid velocity signal is generated by said radial velocity generating means indicating a reject target;

said computing means comprises means for testing said radar target return signal in accordance with a velocity estimate quality signal to determine if said radar target return signal is below a predetermined level of said velocity estimate quality signal;

means for generating an apparent radar cross section of said radar target return signal; and said computing means further comprises means for testing said radial velocity and said apparent radar cross section to determine if said radar target signal is acceptable by being outside of a reject boundary.

10. The sensitivity velocity control apparatus as recited in claim 9 wherein:

said reject boundary testing means comprises memory means for storing said reject data.

11. A sensitivity velocity control apparatus in a radar data processor comprising:

means for estimating a radial velocity of a radar target return signal;

computing means for determining if a no valid velocity estimate signal is generated by said radial velocity estimating means indicating a reject target;

means for estimating an apparent radar cross section of said radar target return signal;

said computing means comprises means for determining if said radar cross section is below a minimum value resulting in a reject target;

said computing means further comprises means for testing said radar target return signal in accordance with a velocity estimate quality signal to determine if said radar target return signal is below a predetermined level of said velocity estimate quality signal; and said computing means further comprises means for testing said radial velocity and said apparent radar cross section to determine if said radar target signal is acceptable by being outside of a reject boundary.

12. The sensitivity velocity control apparatus as recited in claim 11, wherein:

said reject boundary testing means comprises memory means for storing said reject boundary.

* * * * *